United States Patent
Kobussen et al.

[19]

[11] Patent Number: 5,989,609

[45] Date of Patent: *Nov. 23, 1999

[54] METHOD AND APPARATUS FOR COAGULATING THE OUTER SURFACE OF A SAUSAGE STRAND DISCHARGED FROM A SAUSAGE EXTRUDING MACHINE

[75] Inventors: Jos Kobussen; Mart Kobussen, both of Indianola, Iowa; Jaap Kobussen, La Veghel, Netherlands

[73] Assignee: Townsend Engineering Company, Des Moines, Iowa

[ * ] Notice: This patent is subject to a terminal disclaimer.

[21] Appl. No.: 09/150,938

[22] Filed: Sep. 10, 1998

Related U.S. Application Data

[63] Continuation of application No. 08/732,515, Oct. 15, 1996, Pat. No. 5,843,504.

[51] Int. Cl.⁶ .............................. A22C 13/00; A23P 1/00; B28B 5/00

[52] U.S. Cl. ............................ 426/277; 99/535; 198/493; 425/71; 426/241; 426/305; 426/513; 426/646

[58] Field of Search ............................ 426/92, 105, 138, 426/140, 241, 276, 277, 278, 284, 305, 506, 513, 514, 516, 646; 99/516, 535, 470; 425/71; 134/64 R, 122 R; 198/493, 495

[56] References Cited

U.S. PATENT DOCUMENTS

| | | | |
|---|---|---|---|
| 1,708,253 | 4/1929 | Ball et al. ................................. | 426/506 |
| 2,980,538 | 4/1961 | Wolf ........................................ | 426/506 |
| 3,821,439 | 6/1974 | Cohly et al. .......................... | 426/140 X |
| 4,025,455 | 5/1977 | Shackle .................................... | 252/316 |
| 4,169,818 | 10/1979 | DeMartino ............................. | 260/17 R |
| 4,172,055 | 10/1979 | DeMartino ............................. | 260/17 R |
| 4,339,940 | 7/1982 | MacKay et al. ........................... | 72/402 |
| 4,352,232 | 10/1982 | Winders et al. ...................... | 29/243.56 |
| 4,401,329 | 8/1983 | Pedroia .................................. | 289/18.1 |
| 4,404,229 | 9/1983 | Treharne ................................. | 426/513 |
| 4,458,402 | 7/1984 | Evans et al. .......................... | 29/243.56 |
| 4,525,898 | 7/1985 | Gallion et al. ...................... | 24/30.5 W |
| 5,049,711 | 9/1991 | August ................................... | 426/241 |
| 5,053,239 | 10/1991 | Vanhatalo et al. ...................... | 426/412 |
| 5,204,121 | 4/1993 | Bucheler et al. ....................... | 424/495 |
| 5,221,228 | 6/1993 | Pedroia .................................... | 452/48 |
| 5,532,014 | 7/1996 | Kobussen et al. ...................... | 426/513 |
| 5,554,401 | 9/1996 | Alexander et al. ................. | 426/277 X |
| 5,843,504 | 12/1998 | Kobussen et al. ...................... | 426/277 |

FOREIGN PATENT DOCUMENTS

WO 93/12660  7/1993  WIPO .

*Primary Examiner*—Gregory C. Yeung
*Attorney, Agent, or Firm*—Zarley, McKee, Thomte, Voorhees & Sease

[57] ABSTRACT

The sausage strand is extruded onto a belt and carried through a brine shower system for about 40 seconds. The brine is sprayed through nozzles onto the sausage while traveling on the belt. The sausage is turned several times during the shower to insure even brine distribution. The conveyor speed is controlled to match the speed of the extruder thereby preventing stretching of the product as it is being extruded. The conveyor provides exact motion control of the sausage rope and the dwell time in the brine shower can be exactly regulated. Since the conveyor system is open it lends itself to easy cleaning and visual inspection. The conveyor consists of a frame which supports the conveyor system, the brine shower system, air knives and the infrared heater. The brine shower system is composed of a drip pan, a brine tank, a centrifugal pump and a plumbing/brine distribution network. The centrifugal pump conveys the brine from the tank through the brine distribution network. The brine is sprayed onto the sausage through nozzles located at many intervals throughout the whole conveyor section.

16 Claims, 3 Drawing Sheets

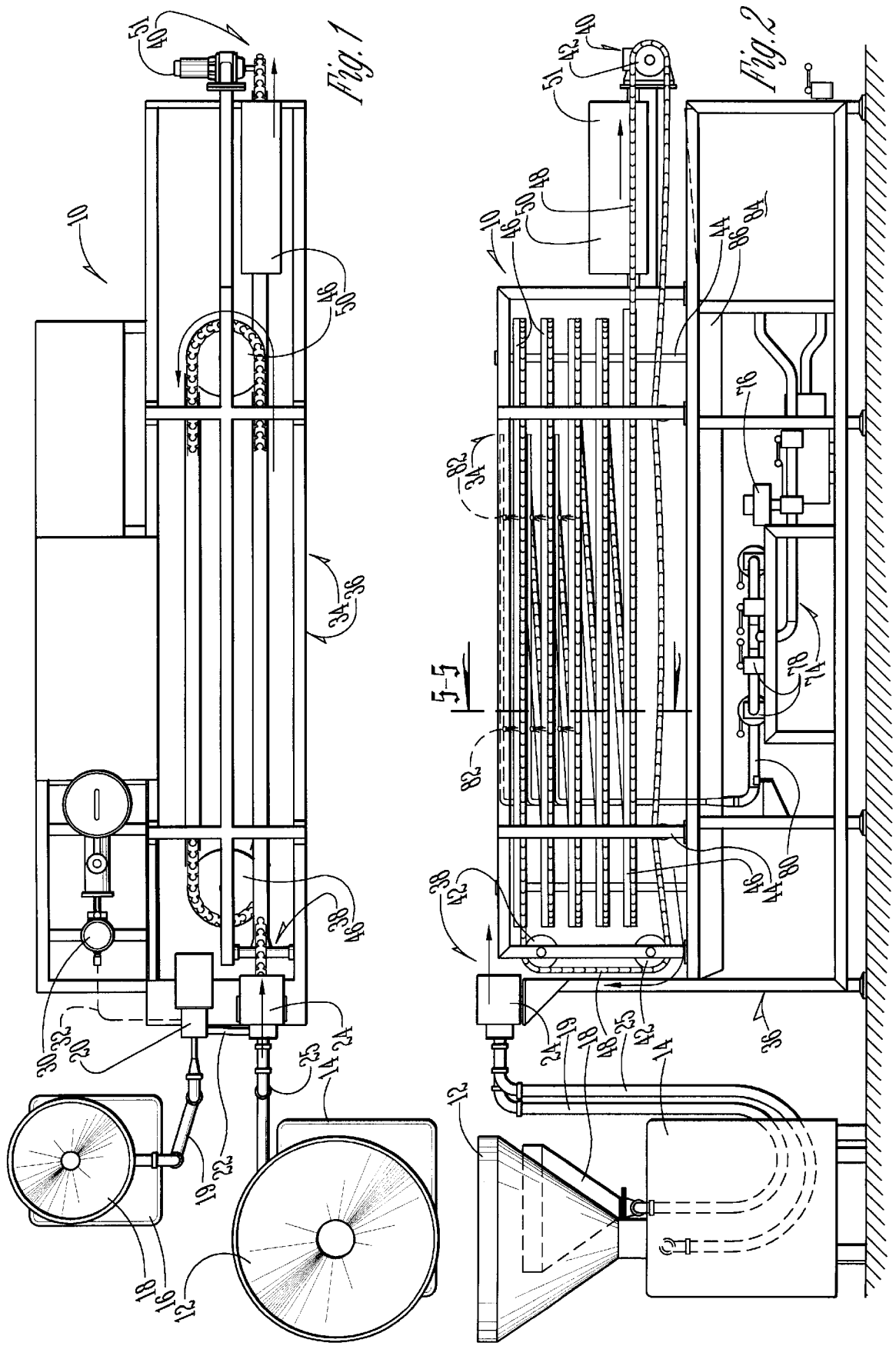

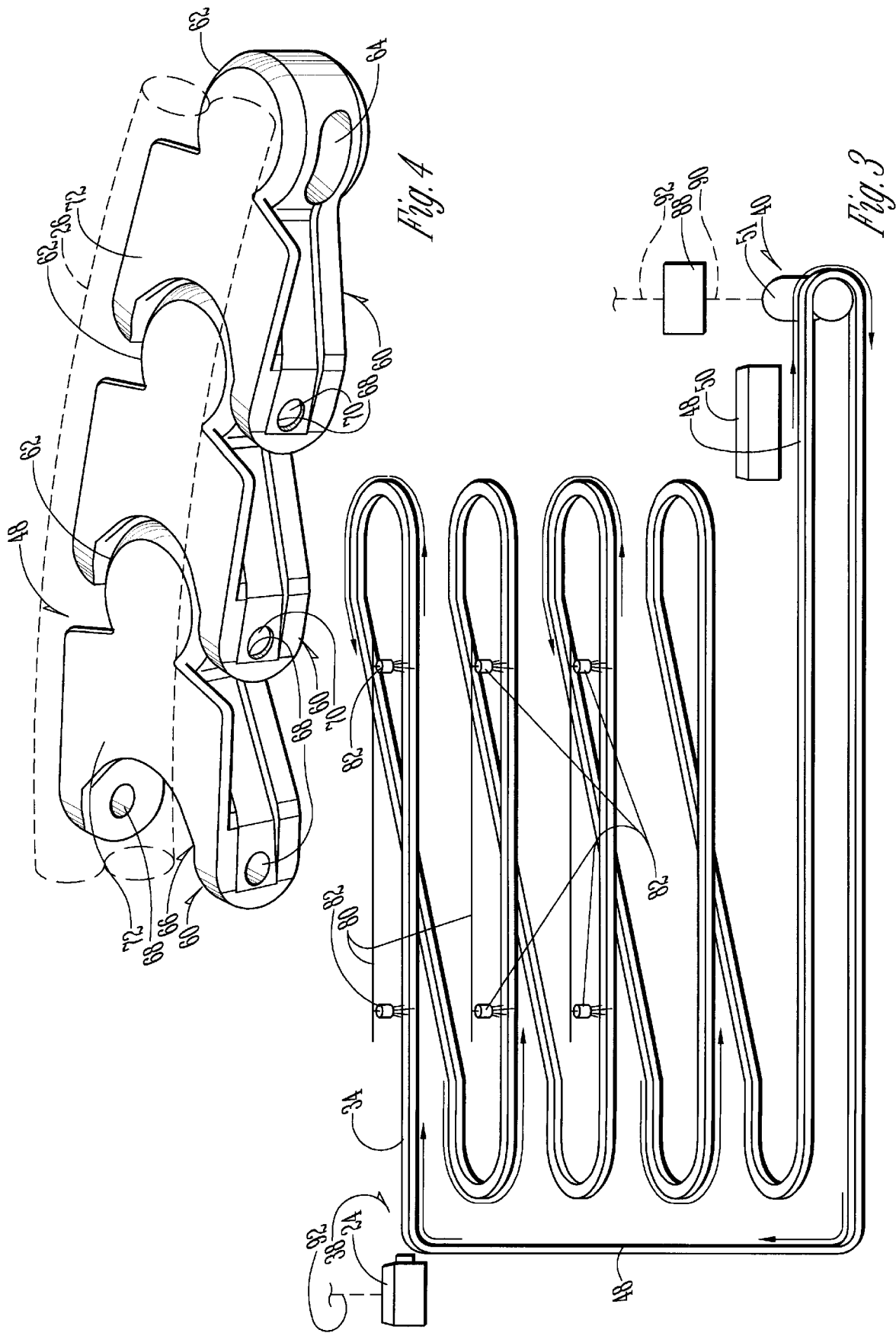

METHOD AND APPARATUS FOR COAGULATING THE OUTER SURFACE OF A SAUSAGE STRAND DISCHARGED FROM A SAUSAGE EXTRUDING MACHINE

CROSS REFERENCE TO A RELATED APPLCICATION

This application is a continuation of Ser. No. 08/732,515 filed Oct. 15, 1996, now U.S. Pat. No. 5,843,504.

BACKGROUND OF THE INVENTION

In recent times, it has become known to coextrude a strand of sausage material which has an inner core of meat emulsion having an outer surface material that can be coagulated to provide an encasement for the strand. The coagulation normally includes subjecting the extruded strand to a brine solution. The brine is applied immediately after the strand is extruded.

In the past this was done by extruding the sausage into a brine bath and letting the sausage float, on top of the brine, into a helical pipe. The dwell time of the sausage in the brine was determined by the length of the helical piping, the downward angle and the speed of the brine flow. Several disadvantages were discovered using this method. It was found that different sausage diameters went through the helix with different speeds. Because the extrusion speed stayed equal, exact diameter control was lost due to stretching. This would give very poor weight control when linking the strand into individual sausages. In addition, the exact dwell time in the brine was not achieved and would cause differences in uniformity of the casing. Further, it was found that often the sausage strand would tighten around the center of the helix and become jammed. This would always cause a production interruption and lengthy delays. Cleaning the inside of the pipe presented problems because inspection requires that one can visually check for cleanliness and this was not possible.

It is therefore a principal object of this invention to provide a method and means for coagulating the outer surface of a sausage strand discharged from a sausage extruding machine wherein the sausage strand will not be stretched as it moves either from the extruder to the conveyor, or while it is on the conveyor.

A further object of this invention is to provide a method and means for coagulating the outer surface of a sausage strand discharged from a sausage extruding machine which will spray brine on the sausage strand at a plurality of positions along the length thereof.

A still further object of this invention is to provide a method and means for coagulating the outer surface of a sausage strand discharged from a sausage extruding machine which is easily cleaned and visually accessible during operations.

A still further object of this invention is to provide a method and means for coagulating the outer surface of a sausage strand discharged from a sausage extruding machine when the sausage strand is cured at least in part by an infrared heat source.

These and other objects will be apparent to those skilled in the art.

SUMMARY OF THE INVENTION

The sausage strand is extruded onto a belt and carried through a brine shower system for about 40 seconds. The brine is sprayed through nozzles onto the sausage while traveling on the belt. The sausage is turned several times during the shower to insure even brine distribution.

The conveyor speed is controlled to match the speed of the extruder thereby preventing stretching of the product as it is being extruded. The conveyor provides exact motion control of the sausage rope and the dwell time in the brine shower can be exactly regulated. Since the conveyor system is open it lends itself to easy cleaning and visual inspection. The conveyor consists of a frame which supports the conveyor system, the brine shower system, air knives and the infrared heater.

The belt is a Multi-Flex chain made from Acetal plastic. The links are secured with stainless steel pins. Twenty four meters of belt running on four tiers provide the brine shower dwell time that is required.

The brine shower system is composed of a drip pan, a brine tank, a centrifugal pump and a plumbing/brine distribution network. The brine tank is an insulated reservoir for the recirculating brine distribution system. The double walled brine tank is insulated and contains a flow multiplier to agitate the brine and keep the salt in solution. The drip pan runs the length of the system, not occupied by the brine tank. It catches the brine dripping from the sausage and conveyor and allows it to flow back in to the brine tank. The centrifugal pump conveys the brine from the tank through the brine distribution network. The brine is sprayed onto the sausage through nozzles located at many intervals throughout the whole conveyor section.

BRIEF DESCRIPTION OF THE DRAWINGS

FIG. 1 is a plan view of the sausage extruder unit and the associated conveyor;

FIG. 2 is a side elevational view thereof as viewed from the bottom of FIG. 1;

FIG. 3 is a schematic view of the conveyor unit;

FIG. 4 is an enlarged scale perspective view of the conveyor belt; and

DESCRIPTION OF THE PREFERRED EMBODIMENT

Figure 5:
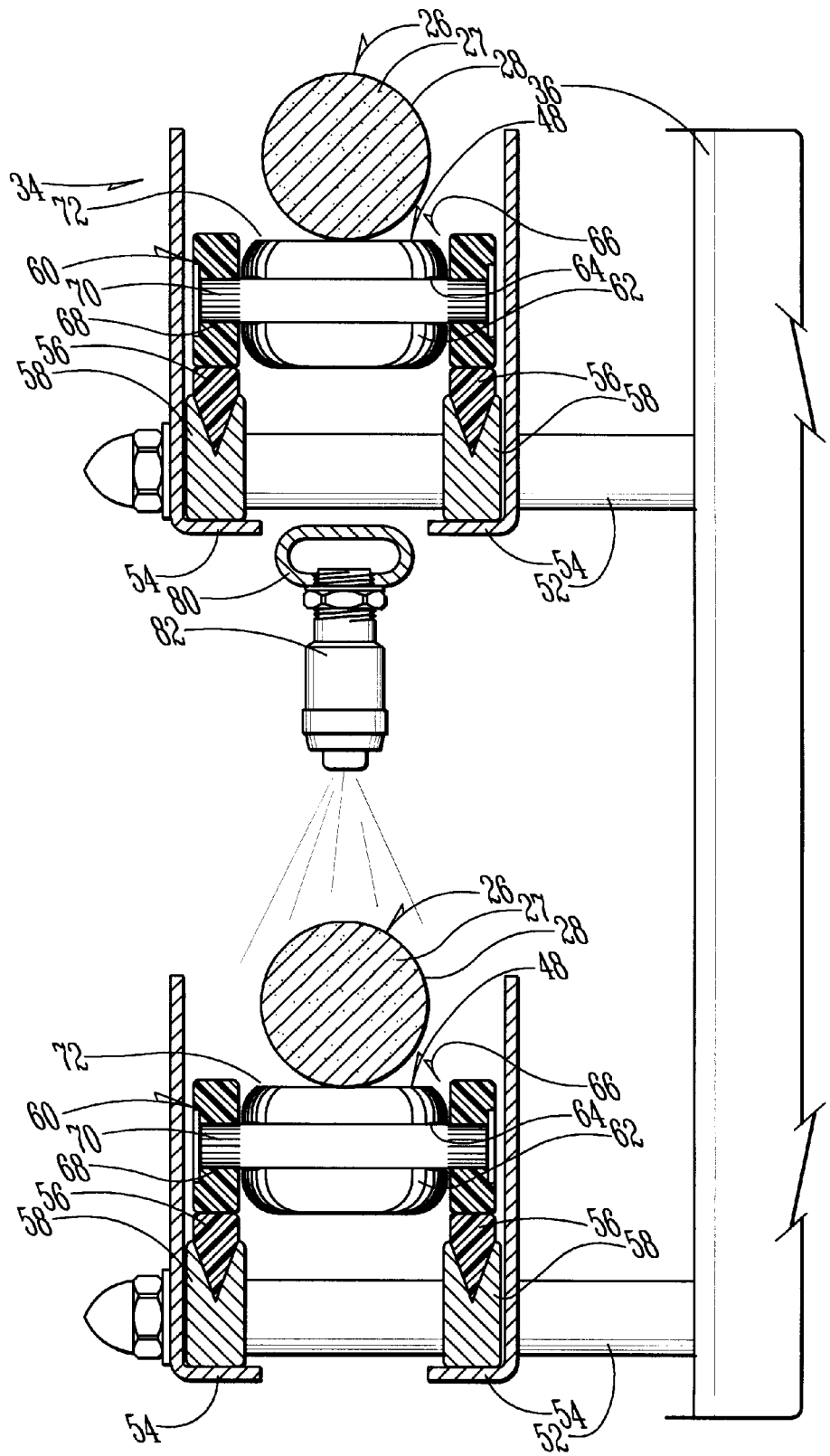
FIG. 5 is an enlarged scale sectional view taken on line 5—5 of FIG. 2.

The term "sausage" as used herein refers to any type of emulsified meat product that is formed into sausage or frankfurter links or the like.

The numeral 10 designates a coextruding machine and conveyor. The numeral 12 is a meat emulsion hopper using a meat pump machine for pumping emulsified meat. A collagen gel pump 16 has a hopper 18 for receiving the collagen gel. It is connected by conduit 19 to inline mixer 20. A tube 22 connects the inline mixer 20 to the coextruder 24 which is capable of extruding a cylindrical strand of meat emulsion with a collagen gel material on the outer surface thereof. Coextruder 24 is connected by tube 25 to the meat pump 14. The conventional coextruded strand of sausage 26 (FIG. 5) has an emulsified meat material core 27 with the collagen gel comprising the outer surface 28 thereof. Liquid smoke from liquid smoke dispenser 30 is used as a coagulation material to coagulate the outer surface 28 of sausage strand 26. The liquid smoke dispenser 30 can be connected in any convenient way such as by line 32 to the inline mixer 20 (FIG. 1).

A conveyor 34 is mounted on frame 36 and has a point of beginning 38 adjacent the output end of coextruder 24, and a discharge station 40 which is located outwardly and downwardly from the point of beginning 38. Three sprockets 42 are rotatably mounted on frame 36 and are adapted to rotate about a horizontal axis. As best shown in FIG. 2, two of the sprockets 42 are vertically disposed with respect to each other below point of beginning 38, and the third sprocket 42 is located on the outer end of a conveyor adjacent discharge station 40.

Two vertical shafts 44 are mounted on opposite ends of frame 36. Each shaft 44 has five rotatably disposed sprockets 46 thereon which are adapted to rotate on shafts 44 about the vertical axis of the shafts. Each set of five sprockets 46 are located in the same parallel plane as one each of the sprockets on the opposite vertical shaft 44. An endless conveyor belt 48 is circuitiously mounted on the sprockets 42 and 46. An infrared heater 50 is mounted on frame 36 adjacent discharge station 40. A drive 51 for the conveyor belt 48 is located adjacent the discharge station 40 as best shown in FIGS. 1 and 2.

Belt 48 (FIG. 5) is disposed between a plurality of elongated L-shaped guides 54 which are secured to frame 36. Elongated rails 56 mounted on bearings 58 extend longitudinally through the guides. With reference to FIG. 4, the conveyor belt 48 is comprised of a plurality of belt segments 60 which each have a circular male member 62 at one end thereof with a laterally extending connection slot 64. A semi-circular female slot 66 appears at the end of belt segment 60 opposite to circular male member 62. Laterally extending apertures 68 extend through the semi-circular female slot 66. Laterally extending pins 70 extend through the aperture 68 and thence through the slot 64 to interconnect the belt segments 60. The apertures 68 permit the belt segment 60 to pivot about the longitudinal axes of aperture 68, and the slot 64 permits the belt segments to have limited pivoted movement about a vertical axis passing through the slot 64 so that the conveyor belt can reverse its direction of travel around sprockets 48. The center portion of each belt segment 60 is comprised of a flat supporting surface 72 which is in the same plane as the upper surfaces of the circular male member 62 and the body of the belt segment surrounding the female slots 66.

With reference to FIG. 2, a brine circuit system 74 includes a brine pump 76. A plurality of miscellaneous control valves 78 are imposed in the brine circuit 74 to selectively control the flow of brine through the system. A fluid line 80 extends from pump 76 and includes a plurality of spaced nozzles 82 which, as discussed hereafter, are located in a plurality of locations on frame 36 directly above the conveyor belt 48 (see FIG. 5) to dispense a spray of fluid brine on the strand of sausage 26.

Brine circuit 74 includes a brine tank 84 which is connected to a brine collection tray 86 located below the various tiers of conveyor belt 48.

A controller 88, such as a computer or the like, is mounted on frame 36 and is connected by line 90 to conveyor drive 51 and is connected by line 92 to coextruder 24. The purpose of controller 88 is to coordinate the discharge speed of the extruded strand of sausage 26 with the speed of the conveyor belt 48 so that the speed of the sausage strand upon discharge is substantially the same speed as the conveyor imparts to the sausage strand once the strand is being conveyed. This prevents the sausage strand from being stretched so as to distort its cross-sectional section while being processed.

In operation, the meat emulsion hopper 12 is charged with a supply of meat emulsion, and the collagen hopper 18 is charged with a quantity of collagen gel. Similarly, the liquid smoke dispenser 30 is charged with liquid smoke so that the liquid smoke is combined with the collagen gel within inline mixer 20.

The mixture of liquid smoke and collagen gel is transmitted through tube 22 to coextruder 24 which conventionally discharges the sausage strand 26 with the center core of meat emulsion 27 in an outer surface comprised of the collagen gel and liquid smoke. The liquid smoke is adapted to coagulate the collagen gel in the presence of air and a brine solution. The strand of sausage 26 is discharged from extruder 24 onto the point of beginning of the conveyor 34. The sausage strand progresses along the moving conveyor belt 48 of the conveyor 34 and is moved under a plurality of the nozzles 82 which spray a quantity of brine on the moving sausage strand.

The controller 88 coordinates the speed of the rate of discharge of the strand of sausage 26 with the longitudinal movement of the conveyor belt 48 as dictated by the conveyor drive 51 so that the elongated strand will not be stretched during its movement.

It should also be noted that the sausage strand rotates slightly from side to side about its longitudinal axes as it progresses downwardly with the conveyor belt 48. This is particularly induced by the configuration of the conveyor belt as it reverses direction. See FIG. 3. This rotation of the sausage strand about its longitudinal axis better permits the brine sprayed from the nozzles 82 to contact all of the outer surface 28 of the sausage strand 26 to enhance the coagulation thereof.

The infrared heater 50 emits heat to stimulate the coagulation of the outer surface 28 as the sausage strand moves therethrough on the conveyor belt 48.

The excess brine from nozzles 82 flows downwardly into the brine collection tray 86, and thence into brine tank 84 wherein the excess brine is recirculated through the system.

The controller 88 is also adapted to cause the strand of sausage 26 to move from the point of beginning 38 to the discharge station 40 in approximately 40 seconds to permit the brine sufficient time to coagulate the outer surface 28 of the sausage strand 26.

When the sausage strand reaches the discharge station 40, the outer surface 28 is sufficiently coagulated to provide strength to the sausage strand where it is discharged into any suitable collection receptacle. The sausage strand can also be formed into a plurality of lengths at that location by conventional structure.

It is therefore seen that the device and method of this invention will achieve at least their principal objectives.

What is claimed is:

1. A conveyor for moving an extruded strand of sausage from an extruding machine, and for coagulating the outer surface of said strand of sausage, comprising, a frame, a continuous conveyor on said frame extending along a route of travel from a point of beginning to a discharge station, and thence back to said point of beginning, said route of travel comprising a serpentine route that proceeds progressively from said point of beginning in a first direction, and thence seriately in a second and opposite direction to a discharge station, and thence back to said point of beginning, a brine fluid circuit disposed on said frame above said conveyor with a plurality of discharge nozzles thereon to spray brine on a strand of sausage moving with said conveyor to coagulate a strand of sausage on said conveyor extruded from said extruding machine.

2. The conveyor of claim 1 wherein said conveyor has power means and control means associated therewith and being connectable to an extruding machine for extruding a strand of sausage, wherein the speed of said conveyor can be coordinated with the speed at which said strand of sausage is discharged from said extruding machine so that said strand of sausage is not stretched as it moves from said extruding machine onto said conveyor.

3. The conveyor of claim 1 wherein a heat source is located adjacent said conveyor to enhance the coagulation of said sausage strand.

4. The conveyor of claim 3 wherein said heat source is located adjacent said discharge station.

5. The conveyor of claim 3 wherein said heat source is an infrared heater.

6. The conveyor of claim 1 wherein said conveyor has a continuous conveyor chain which has a supporting surface which has a laterally extending flat surface component which can be turned 180° to reverse its direction of movement and which can be progressively sloped between said point of beginning to said discharge station.

7. The conveyor of claim 6 wherein said conveyor is visibly disposed within said frame to facilitate cleaning therof and to permit visual examination of a strand of sausage being conveyed thereby.

8. A conveyor for moving an extruded strand of sausage from an extruding machine, and for coagulating the outer surface of said strand of sausage, comprising, a frame, a continuous conveyor on said frame extending along a route of travel from a point of beginning to a discharge station, and thence back to said point of beginning, a brine fluid circuit disposed on said frame above said conveyor with a plurality of discharge nozzles thereon to spray brine on a strand of sausage moving with said conveyor to coagulate a strand of sausage on said conveyor extruded from said extruding machine, wherein said route of travel is continuous along a serpentine route that proceeds progressively from a point of beginning in a first direction, and thence seriately in a second and opposite direction to a discharge station, and thence back to said point of beginning at a location adjacent the position that said strand is extruded.

9. The conveyor of claim 8 wherein said conveyor has power means and control means associated therewith and adapted for connection to an extruding machine for extruding a strand of sausage, wherein the speed of said conveyor can be coordinated with the speed at which said strand of sausage is discharged from said extruding machine so that said strand of sausage is not stretched as it moves from said extruding machine onto said conveyor.

10. A method of coagulating the outer surface of an extruded strand of sausage, comprising the steps of:

extruding a continuous strand of sausage onto a sloping moving continuous mechanical conveyor, spraying a brine solution on said strand of sausage along its length as it moves along the slope of the conveyor, and maintaining said strand of sausage on said conveyor for a route of travel a sufficient length of time to permit the outer surface of said strand of sausage to coagulate, wherein said route of travel of said conveyor is continuous along a serpentine route that proceeds progressively from a point of beginning in a first direction, and thence seriately in a second and opposite direction to a discharge station, and thence back to said point of beginning.

11. A method of coagulating the outer surface of an extruded strand of sausage, comprising the steps of:

extruding a continuous strand of sausage onto a sloping moving continuous mechanical conveyor, spraying a brine solution on said strand of sausage along its length as it moves along the slope of the conveyor, and maintaining said strand of sausage on said conveyor for a route of travel a sufficient length of time to permit the outer surface of said strand of sausage to coagulate, wherein said route of travel of said conveyor is continuous along a serpentine route that proceeds progressively from a point of beginning in a first direction, and thence seriately in a second and opposite direction to a discharge station, and thence back to said point of beginning at a location adjacent the position that said strand is extruded.

12. The method of claim 10 wherein said strand of sausage is maintained on said conveyor for a period of about 40 seconds.

13. The method of claim 10 wherein the brine sprayed on said strand of sausages is collected after being sprayed and is sprayed on a subsequent sausage strand segment deposited on said conveyor.

14. The method of claim 10 wherein the moving speed of the conveyor is coordinated by the rate at which the sausage strand is deposited on the conveyor to prevent the strand of sausage from being stretched.

15. The method of claim 10 wherein the brine is sprayed on said strand of sausage at a plurality of locations along said conveyor.

16. The method of claim 10 wherein said strand of sausage is subjected to a source of heat at a segment of its travel with said conveyor.

\* \* \* \* \*